United States Patent [19]

Johnson et al.

[11] Patent Number: 5,684,948
[45] Date of Patent: Nov. 4, 1997

[54] MEMORY MANAGEMENT CIRCUIT WHICH PROVIDES SIMULATED PRIVILEGE LEVELS

[75] Inventors: James Scott Johnson, Fort Worth; Tim Short, Duncanville, both of Tex.; Gideon Intrater, Sunnyvale, Calif.

[73] Assignee: National Semiconductor Corporation, Santa Clara, Calif.

[21] Appl. No.: 523,052

[22] Filed: Sep. 1, 1995

[51] Int. Cl.$^6$ .................................................. G06F 11/00
[52] U.S. Cl. .................................. 395/186; 395/733
[58] Field of Search .................................. 395/186, 733, 395/734, 737, 738, 739, 742, 740, 188.01

[56] References Cited

U.S. PATENT DOCUMENTS

| | | | |
|---|---|---|---|
| 4,758,950 | 7/1988 | Cruess et al. | 364/200 |
| 4,779,187 | 10/1988 | Letwin | 364/200 |
| 4,812,967 | 3/1989 | Hirosawa et al. | 363/200 |
| 5,109,329 | 4/1992 | Strelioff | 395/725 |
| 5,390,332 | 2/1995 | Golson | 395/725 |
| 5,410,709 | 4/1995 | Yu | 395/725 |
| 5,481,725 | 1/1996 | Jakakumar et al. | 395/725 |
| 5,483,649 | 1/1996 | Kuznetsov et al. | 395/186 |
| 5,511,184 | 4/1996 | Lin | 395/734 |
| 5,511,200 | 4/1996 | Kakakumar | 395/739 |
| 5,535,397 | 7/1996 | Durante et al. | 395/740 |

OTHER PUBLICATIONS

*Multiprocessor System Architecture A Technical Survey of Multiprocessor/Multithreaded Systems using SPARC, Multilevel Bus Architectures and Solariss (SunOS)*, by Ben Catanzaro, 1994 Sun Microsystems, Inc., pp.93–114.

Primary Examiner—Robert W. Beausoliel, Jr.
Assistant Examiner—Joseph E. Palys
Attorney, Agent, or Firm—Limbach & Limbach L.L.P.

[57] ABSTRACT

A memory management unit provides security functions for a processor which has no specialized hardware support for a memory management unit. An exception security system is provided for use with an exception-capable processor. In an unsecure mode, the processor responds to an exception by retrieving unprotected exception information from generally accessible exception information register circuitry and executes an exception processing routine indicated by the unprotected exception information. Secure exception information register circuitry is provided in the memory management unit that holds a protected copy of exception information. Exception detection circuitry within the memory management unit detects an exception and causes the secure exception information register circuitry to provide the protected copy of the exception information to the processor in place of the unprotected exception information which would otherwise be provided to the processor from the generally accessible exception information register circuitry. Thus, the processor executes an exception routine indicated by the protected copy of the exception information and not an exception routine indicated by the unprotected exception information. In order to simulate processor privilege levels for each of a plurality of processor address space segments, current privilege level circuitry holds a current privilege level access indication, and programmable circuitry associated with each of the address space segments holds a privilege level access indication associated that address space segment. Access validation circuitry determines which of the address space segments is being accessed by the processor and compares the current privilege level access indication with the privilege level access indication associated with the address space segment being addressed. The access validation circuitry includes violation indication means, accessible by the processor, that indicates a result of the comparison. Preferably, current privilege level circuitry is provided which holds a current privilege level indication and which also includes stack circuitry that holds a plurality of security level indications.

10 Claims, 1 Drawing Sheet

MEMORY MANAGEMENT CIRCUIT WHICH PROVIDES SIMULATED PRIVILEGE LEVELS

TECHNICAL FIELD OF THE INVENTION

The present invention relates to memory management circuitry and, in particular, to a memory management circuit which provides simulated privilege levels to a processor which otherwise has none.

BACKGROUND OF THE INVENTION

Security functions for processors are well known in the art. These security functions, if provided, are typically "built-in" to a processor. Also, some security functions may be provided in a memory management unit (MMU), but conventional processors support MMU's with opcodes or other signals to a particular MMU.

Many processors, particularly those desirable for use in embedded applications, are not designed to support multiple "privilege" levels. This may be because most embedded applications do not require security functions. However, some embedded applications, such as cryptography, do require security functions. One way to provide these security functions with such a processor is to completely redesign the processor to support multiple privilege levels. But this would increase the time to market for those secure embedded applications.

SUMMARY OF THE INVENTION

The present invention is a memory management unit which provides security functions for a processor which has no specialized hardware support for a memory management unit. In accordance with the invention, an exception security system is provided for use with an exception-capable processor. In an unsecure mode, the processor responds to an exception by retrieving unprotected exception information from generally accessible exception information register circuitry and executes an exception processing routine indicated by the unprotected exception information. In accordance with the first aspect of the invention, secure exception information register circuitry is provided in the memory management unit that holds a protected copy of exception information. Exception detection circuitry within the memory management unit detects an exception and causes the secure exception information register circuitry to provide the protected copy of the exception information to the processor in place of the unprotected exception information which would otherwise be provided to the processor from the generally accessible exception information register circuitry. Thus, the processor executes an exception routine indicated by the protected copy of the exception information and not an exception routine indicated by the unprotected exception information.

In order to simulate processor privilege levels for each of a plurality of processor address space segments, current privilege level circuitry holds a current privilege level access indication, and programmable circuitry associated with each of the address space segments holds a privilege level access indication associated that address space segment. Access validation circuitry determines which of the address space segments is being accessed by the processor and compares the current privilege level access indication with the privilege level access indication associated with the address space segment being addressed. The access validation circuitry includes violation indication means, accessible by the processor, that indicates a result of the comparison.

Preferably, current privilege level circuitry is provided which holds a current privilege level indication and which also includes stack circuitry that holds a plurality of security level indications. Exception start detection circuitry detects an exception and, in response thereto, pushes the current privilege level indication onto the stack circuitry and sets the indication of the current privilege level to a predetermined privilege level. Exception end detection circuitry detects an end to exception processing and pops the current privilege level indication from the stack circuitry into the current privilege level circuitry.

A better understanding of the features and advantages of the invention will be obtained by reference to the following detailed description and accompanying drawing which sets forth illustrative embodiments in which the principles of the invention are utilized.

DETAILED DESCRIPTION

Figure 1:
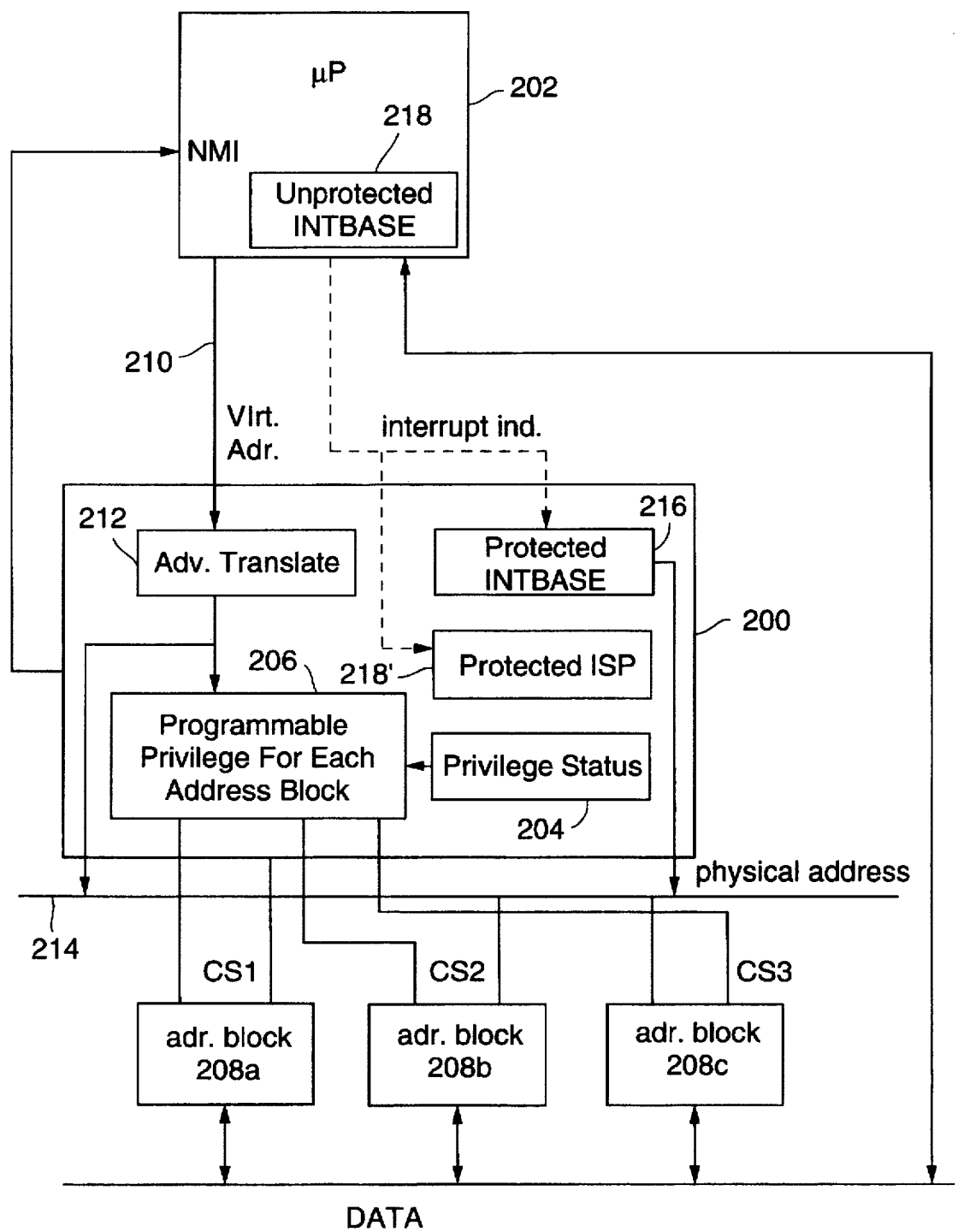
FIG. 1 is a block diagram illustrating an embodiment of a memory management unit in accordance with the present invention and its interaction with a processor which has no privilege level implementation.

Referring now to FIG. 1, the memory management unit (MMU) 200 illustrated therein provides hardware security support for a processor 202 which otherwise has no security functions.

Broadly speaking, the MMU 200 provides support circuitry for the processor 200 to simulate a plurality of processor code privilege domains, where the privilege domains are arranged hierarchically. For example, two domains of processor code privileges may be simulated, Kernel and Supervisor, with Kernel being higher than supervisor. A number of registers determine the operation of the MMU 200.

First, the status of a currently executing process is held in a privilege status register 204. Also, programmable privilege circuitry 206 is provided for defining the privilege level of the code (and/or data) in each of a plurality of address blocks addressable by the processor 202 (shown in FIG. 1 as adr. block 208a, adr. block 208b; and adr. block 208c). Where only two domains of processor code privilege levels are provided, one bit may be provided in the programmable privilege circuitry 206 for each address block. The bit being set indicates that the corresponding address block has one privilege level and the bit being cleared indicates that the corresponding address block has the other privilege level. In one actual implementation of an MMU for use with a cryptographic processor, three eight-bit registers are employed to designate the privilege level associated with each of twenty-four addressable blocks.

In operation, the MMU 200 receives a "virtual" address from the processor 202 via a virtual address line 210. The virtual address is translated by address translation circuitry 212 and is provided as a physical address onto a physical address line 214. Meanwhile, the translated address is also provided to the programmable privilege circuitry 206, which determines from both the physical address provided from the address translation circuitry 212 and the current privilege status held in the privilege status register whether to actually select (via one of chip select lines CS1, CS2, and CS3) the addressable block indicated by the physical address. In particular, the programmable privilege circuitry 206 selects the addressable block indicated by the physical address only if the current privilege status is equal to or greater than the privilege level defined by the programmable privilege circuitry 206 for the addressed addressable block.

For example, if only Kernel and Supervisor privilege levels are simulated as discussed above, and a process executing in the simulated Supervisor privilege domain (as indicated by the current privilege status in the privilege status register 204) attempts to access an addressable block defined as being in the simulated Kernel domain, the MMU 200 prevents the access by failing to assert the chip select line associated with the addressable block. Preferably, the MMU 200 also notifies the simulated Kernel process, via a non-maskable interrupt (NMI), that a domain access violation has occurred.

With regard to interrupts, a significant feature of the privilege domain simulation is the protected copy 216 of the processor 202 interrupt base (INTBASE) register 218. In normal operation of the processor 202, upon interruption (either by an interrupt or by an exception), the processor 202 would use the INTBASE register value to store the address of an interrupt dispatch table (IDT), where addresses of interrupt processing routines are stored. These addresses would then be used to "vector" to the appropriate interrupt processing routine. However, the MMU 200, upon detection of an exception (e.g., via processor status lines provided from the processor 202 to the MMU 200), provides the contents of the protected copy from the protected INTBASE register to override the upper bits (i.e., bits 31:7) of the IDT address supplied by the processor 202 from the unprotected INTBASE register 218. In this way, an attacker cannot program the processor 202 to improperly vector to an interrupt routine that has been provided surreptitiously. That is, while a process of any privilege level can change the unprotected INTBASE register 218, the contents of the protected INTBASE register 216 can only be changed by a process that has a simulated Kernel privilege level.

As an additional feature, the MMU 200 compares the processor-supplied IDT address upper bits from the unprotected INTBASE register 218 to the value held in the protected INTBASE register 216 at each exception occurrence. If these bits do not compare, the MMU sets an appropriate status bit in an MMU status register.

In some embodiments, the MMU 202 may have circuitry that allows the processor 202 to utilize "protected memory" for its interrupt stack. (By "protected memory" it is meant memory that is in a processor 202 address block that has been defined, via the programmable privilege level circuitry 206 to be in an addressable block which has a simulated privilege level higher than the simulated privilege level of the currently executing process.) In such embodiments, the IDT be in an unchangeable memory, such as ROM. Also, at least an initial portion of each interrupt hander that checks the validity of the ISP (e.g., by comparing it to an intial value or by comparing it to a known valid range) must be in unchangeable memory. This is to protect against an attacker who may corrupt the Interrupt Stack Pointer (ISP) to point to the NMI entry in the IDT. Then, by causing an NMI (e.g., by attempting to write to an addressable block which has a simulated privilege level higher than the simulated privilege level of that process), the return address of the attacking process will be replaced for the NMI entry in the IDT (by being pushed onto the "interrupt stack") and the processor 202, rather than vectoring to the actual NMI handler, will instead vector to the attacking process. In particular, the processor 202 will vector to the attacking process in a simulated Kernel mode which would allow the attacking process free access to "protected" resources of the processor 202. For this reason, in a preferred embodiment of the invention, a protected copy 218' of the ISP is kept in the MMU 200 in much the same way that a protected copy 216 of the INTBASE register is kept in the MMU 200. With an MMU that has a protected copy 218' of the ISP in the MMU 200, there is no need to keep the IDT in ROM since there is no way to corrupt the ISP.

With regard to the current simulated privilege level held in the privilege status register 204, this can only be changed via software by a process that has a simulated Kernel level. In particular, upon detecting a processor 202 exception, the MMU 200 pushes the current privilege level indication onto a privilege level stack which is part of the programmable privilege circuitry 206. The privilege level stack may have, for example, space for eight such privilege level indications. After pushing the current privilege level indication onto the privilege level stack, the MMU 200 sets the current privilege level indication in the privilege status register 204 to Kernel. Then, upon an exception return, the MMU 200 pops the privilege level stack, thus returning the current privilege level to its state immediately prior to occurrence of the exception.

The MMU 200 registers are part of the processor 200 address space and, thus, are protected in the same way as other resources in the processor 200 address space (i.e, using the programmable privilege level circuitry 206. The MMU 200 registers are protected by circuitry which requires that all writes to any MMU 200 register be immediately preceded by an "unlock" code being written to an MMU unlock register, MM_UNLOCK. If the unlock access is not performed, the write command to the MMU register will be ignored. Preferably, addressing of the MM_UNLOCK register is fully decoded, thus minimizing the possibility of inadvertently unlocking the MMU register set. Also, in a preferred embodiment, a particular unlock code (e.g., '6Ah') may be written any number of times prior to the access to the MMU register desired to be accessed. That is, upon completion of any write cycle, except to MM_UNLOCK, write accesses to the MMU will relock. The MMU_UNLOCK register has no effect on reads.

In one particular embodiment of the invention, other MMU 200 registers are defined as follows:
MM_STATUS (Status of MMU)
read only (and clear operation)

Note: Bits 4-1 are cleared by writing a '1' to the appropriate set bit. Writing to bit 0 has no affect at any time.

| | |
|---|---|
| Bits 7–5: | Resv - Reserved. Write has no effect, read as 0. |
| Bit 4: | HWF - Hardware fault. Set if the MMU detects a miscompare in the redundancy check logic. This bit must be cleared in order to reset activation of the interrupt. |
| Bit 3: | SOVF - Security level stack overflow. Set if the exception stack depth exceeds 8; this bit must be cleared in order to reset activation of the interrupt. Writing a one to this bit will reset the MM_STACKPTR to the empty state. |
| Bit 2: | IB_viol - INTBASE Violation. Set if the MMU detects that the INTBASE sourced by the VM32 during exception handling is different from the protected value stored in the MM_INTBASE register. This bit does not cause the MM_int_p to activate. All exception handlers should read the MM_STATUS and VM INTBASE register on entry (See Programmer's Model). |
| Bit 1: | Add_viol. Address Domain Violation. Set if an access is made to a protected address block from a lower security level. This bit must be cleared in order to reset activation of the associated interrupt. |
| Bit 0: | Mode Current Security Level; write has no effect<br>0 Kernel<br>1 Supervisor |

Additional bits may be provided if it is desired to have more than two possible security levels.

MM_int_p_=Add_viol+SOVF+HWF
MM_MODESWITCH (Switch Security Mode to Pop'd Value)

write only; DATA MUST BE 'B5h'

This register serves as a software indication of a pending non-sequential instruction which is intended to pop the stack to set a new security mode or return to the previous security mode after processing an exception. The detection of the non-sequential instruction execution will cause the security mode to be popped from the stack and loaded into the current mode indicator which is located in the MM_STATUS register. Several instructions cause a non-sequential instruction fetch: Bcond, BAL, BR, EXCP, Jcond, JAL, JUMP, RETX and LPR. Bcond or Jcond cause a non-sequential instruction fetch only if the condition is met.

Writing this register will also cause the activation of the output signal mm_blkint. This signal to the ICU will block activation of all interrupts to the VM32, including non-maskable interrupts. mm_blkint is cleared when the MMU detects the non-sequential instruction fetch. IT IS CRITICAL THAT THE MM_MODESWITCH REGISTER IS ONLY WRITTEN IMMEDIATELY PRIOR TO EXECUTION OF A NON-SEQUENTIAL INSTRUCTION TO LIMIT THE POTENTIAL INTERRUPT LATENCY CAUSED BY THE BLOCK SIGNAL.

MM_STACK (Security Mode Stack)
read/write

| | |
|---|---|
| Bites 7–1: | Resv - Reserved. |
| Bit 0: | Mode - Security mode of the top of the stack. Reads pop the stack and writes push the stack. CAUTION: reading the stack when it is empty will cause the SOVF MMU exception. |

MM_STACKPTR
read/write

Reading this register returns the current security stack pointer. Writing this register modifies the current security stack pointer.

| | |
|---|---|
| Bits 7–4: | Resv - Reserved. |
| Bit 3: | emp/ovf - Empty/overflow indication. '0' indicates the security stack contains valid data. '1' and Ptr[2:0]='111' indicates the stack is empty. '1' and Ptr[2:0]='000' indicates the stack is in an overflow condition. |
| Bits 2–0: | Ptr[2:0] - Stack pointer. |

Notes:
1. Continuing to push onto the stack for any reason after an overflow condition has occurred does not increment the Ptr value; Ptr remains '000'.
2. Continuing to pop an empty stack does not decrement the Ptr value. Ptr remains '111'.
3. The data popped from an empty or overflowed security stack is always '1' which is Supervisor mode.
4. Clearing the SOVF bit in MM_STATUS resets the MM_STACKPTR register to the empty state.
5. Reading an overflowed stack decrements the stack pointer and clears the SOVF bit in MM_STATUS.

MM_INTBASE (Protected Interrupt Base Address)
address 200h; read/write

The protected interrupt base address duplicates the function of the VM32A INTBASE register but does so in a protected environment. The security mechanism requires that the lower 7 bits of the VM32A's INTBASE are '0' with the upper 25 bits held to a constant value by the firmware. On each access to the IDT, the upper 25 bits of the address bus are intercepted by the MMU and are sourced from MM_INTBASE[31:7]. The lower 7 bits flow through from the VM32A address. If the upper 25 bits of the address sourced during an IDT access differ from the MM_INTBASE[31:7] value, the 'IB_viol' bit is set in the MM_STATUS register.

The address calculation for the IDT entry is INTBASE+(vector*4). The vector is constrained to the range 0h→17h by the Interrupt Control Unit. This vector range supports all traps, the NMI, and eight maskable interrupts.

Note that it is possible for any software to modify the VM's INTBASE register. If the software sets the lower 7 bits to a non zero value, the VM32A will fetch an incorrect entry from the Dispatch Table in memory. This occurs because the VM32A calculates the IDT entry as VM32A INTBASE+(vector 4). The MMU then overrides ONLY the upper 25 bits of the IDT address with its MM_INTBASE value. Since the lower 7 bits are not referenced to a zero value, the wrong IDT entry is fetched. Thus, Dispatch Tables must be defined with 32 valid entries. Each exception handling routine must test the lower 7 bits of the VM32A's INTBASE register for zero to ensure that the correct IDT entry has been fetched.

Security Protect Registers

One register bit is provided for each block of addressable processor memory space. Preferably, a redundant copy of the security protect register is also provided, which can be used by built-in test software to verify the correctness of protection logic.

In one particular implementation, three security protect registers (MM_PROTECT0, MM_PROTECT1, and MM_PROTECT2) are employed. For that implementation, the following table defines the memory block to register bit mapping:

Additional Registers

MM_VIOLADD (Violation Address) holds the address issued during a bus cycle which caused a memory domain violation interrupt.

MM_VIOLDAT (Violation Data) holds the data sourced for a write command which caused the memory domain violation interrupt.

MM_VIOLACT (Violation Action) indicates the number of core bus byte enables for the action which caused the memory domain violation interrupt, indicates whether the action was a read or write, and indicates the current security mode at the time of the memory domain violation.

MM_MADR provides memory block addresses (i.e., the upper portion of the memory address) during bus master cycles. The lower bits of the address is provided by the bus master.

A progammer's model is now provided for programming the features of the above-described embodiment of the MMU 200:

To write MMU registers, the following steps should be executed:
1. Disable maskable interrupts.
2. Write 6Ah to MM_UNLOCK.
3. Write desired data to register.
   2a. Write accesses automatically lock on completion of load.
4. Repeat 2–3 for additional register writes.
5. Enable maskable interrupts.

To set the protection level for memory blocks, the following steps should be executed:

1. From a simulated kernel-level process, read MM_PROTECT.
2. Modify desired block protection levels.
3. Disable maskable interrupts.
4. Write 6Ah to MM_UNLOCK.
5. Write modified protect byte to MM_PROTECT.
6. Enable maskable interrupts.

To set the protected INTBASE register, the following steps should be executed:
1. Disable all interrupts.
2. Write the INTBASE register in the processor 100. The least significant seven bits must be O.
3. Write 6Ah to MM_UNLOCK.
4. Write INTBASE to MM_INTBASE.
5. Enable all interrupts.

To respond to domain violations, the following steps should be executed:
1. Inspect the least significant seven bits of the processor INTBASE register. If these bits are not all zero, then an incorrect exception routine has been fetched. This should be handled as software policy dictates.
2. Inspect the interrupt stack pointer (ISP). If this is incorrect, it should be adjusted as software policy dictates.
3. If desired, inspect the MM_Status register for "IB_viol" to detect IDT address mismatches. If there is a mismatch, react as software policy dictates.
4. Poll the interrupt control unit (ICU) to determine the cause of the Non-Maskable Interrupt. If there is an MMU domain violation, continue here.
   Note: the current security level (MM_STATUS[0]) is set by the MMU 200 to simulated Kernel mode (0) upon detection of the exception which caused the Non-Maskable Interrupt.
5. Read MM_STATUS to determine what type of error has occurred.
6. If 'Add_viol' is set, read MM_VIOLADD, MM_VIOLDAT, and MM_VIOLACT.
   6a. Write 6Ah to MM_UNLOCK.
   6b. Write a 1 to the Add_viol bit of the MM_STATUS reg. This "empties" the MMU's security level stack.
   6c. Handle as software policy dictates.
      Important Note: All processor general purpose registers and any other device capable of DMA'ing must be cleared at this time for security reasons. While the MMU 200 does block access to the intended target address during an address violation, the MMU does not keep the processor (or a DMAing device) from reading the data bus. Thus, the information on the keepers of the data bus would be available to the offending software unless all general purpose processor 100 registers and all DMA devices are cleared.
   6d. Write 6Ah to MM_UNLOCK.
   6e. Write BAh to MM_MODESWITCH, followed by the RETX instruction to return if the offending software is to be allowed to regain control.
7. If 'SOVF' is set, then the security level of the software that generated the exception has been lost. Either allow the MMU 200 to default to Supervisor level upon return, or reset the security level stack and the system. To reset the security level stack:
   7a. Write 6Ah to MM_UNLOCK.
   7b. Write a 1 to the SoVF bit of the MM_STATUS register to clear the NMI source.
   7c. Adjust the stack as software policy dictates.
   7d. Write 6Ah to MM_UNLOCK.
   7e. Write B5h to MM_MODESWITCH, followed by the RETX instruction to return if the offending software is to be allowed to regain control.
      A note on SOVF: Since any exception condition could cause this, allowing the MMU to default to supervisor level upon return is unwise, as the return may be to an interrupted exception handler in a simulated Kernel process' protected memory, thus producing an "Add_viol" exception.

To change from Kernel security level to Supervisor security level, the following steps should be executed:
1. Disable maskable interrupts.
2. Write 6Ah to MM_UNLOCK.
3. Push the supervisor security level onto the security level stack by writing it to MM_STACK.
4. Write 6Ah to MM_UNLOCK.
5. Write B5h to MM_MODESWITCH.
6. Call or Jump to the location of the supervisor security level code. The supervisor security level is popped off the security stack and is now in force.
7. Enable maskable interrupts.

To change from Supervisor security level to Kernel level, the following steps should be executed:
NOTE: The only way to raise the current security level is to cause a processor 200 exception. Typically this will be through a "trap" instruction. The level will automatically be raised to kernel mode.
1. Set General purpose register with SVC call parameters.
2. SVC—processor 100 generates an SVC Trap exception. The MMU 200 switches to kernel security level. The MMU forces the protected IDT address onto the address bus.
3. The Kernel SVC handler inspects the lower 7 bits of the processor 100 INTBASE register for zero to ensure R was appropriately called.
4. The kernel SVC handler inspects the ISP and, if incorrect, adjusts R as software policy dictates.
5. If desired, inspect MM_Status for "IB_viol" to detect IDT address mismatches, and react as software policy dictates.
6. The simulated-kernel level process now performs the desired function for the supervisor code, if software policy allows.
7. The kernel writes the results into one or more general purpose registers and supervisor memory if necessary.
8. Write 6Ah to MM_UNLOCK.
9. Write B5h to MM_MODESWITCH, followed by the RETX instruction to return from the SVC trap. The supervisor security level is popped off the security level stack and is again in force.

To reset the MMU state, the following steps should be performed:
NOTE: As detailed in the register definitions, the MMU powers up in kernel mode with all addressable assets protected.

In one particular application, the Kernel and Supervisor domains may be defined such that code executing out of any on-chip memory is defined to be in the simulated Kernel execution domain. Processes in this simulated domain can read or write access to all processor 202 registers, all memory mapped peripherals located in on-chip and off-chip memory, and all on-chip and off-chip memory locations in the processor address space. By contrast, code executing out of any off-chip memory is defined to be in the simulated-Supervisor execution domain. The simulated Supervisor domain supports read/write access to all processor 202 registers, to all memory mapped peripherals located in off-chip memory, and to all off-chip memory locations in the processor address space. Each simulated execution domain has its own associated stack located within its own protected memory space.

A process in one execution domain can access services or data in another execution domain only through a specific entry point called a gate. The vectors in the processor 202 Interrupt Dispatch Table (IDT) define these gates. All traps and interrupts pass through separate Kernel domain service routines.

For example, processor software may use a supervisor call trap instruction (EXCP SVC) as the gate through which Supervisor domain code accesses Kernel domain processes or data (see Command Invocation Sequence). The SVC exception processing routine will then execute a requested command and return a status code. For example, in one embodiment, the Supervisor-domain software loads specified processor registers with a command code and other parameters for the requested service prior to invoking the Supervisor Call instruction. The SVC exception service routine then verifies the command code and parameters passed in the registers and branches to the requested command service routine (e.g., ENCRYPT). When the command service routine has completed the requested operation, execution control returns to the SVC exception service routine. The SVC exception service routine then loads a processor register with a command status code, adjusts the PC found on the interrupt stack (PC+4), executes a write to the MMU 200 register MM_MODESWITCH, and returns via a RETX instruction to the external software.

Attached to this specification are the following appendicies, which is to be considered as an integral part of this specification:

Appendix 1: Section 3.2.1.4, Memory Management Unit through and including Section 3.2.7, Bus Element Timing Diagrams Appendix 2: Section 5.1, Firmware States through and including Section 5.3, Memory Management.

It should be understood that various alternatives to the embodiments of the invention described herein may be employed in practicing the invention. It is intended that the following claims define the scope of the invention and that methods and apparatus within the scope of these claims and their equivalents be covered thereby.

3.2.1.4 Memory management Unit (MMU)

The MMU provides hardware support for the software security mechanism for the Keystone.

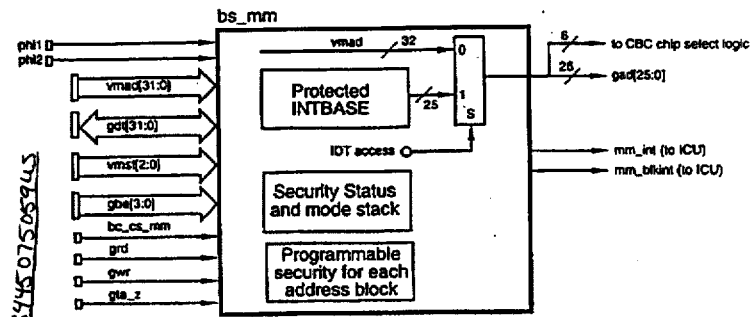

FIGURE 13. Memory Management Unit Block Diagram

3.2.3 Functional Description

3.2.3.1 Core Bus Signal List

Naming convention:

- first letter or first and second letter designate source of signal

| | | |
|---|---|---|
| g = global | mu = multiplier | ct = command timer |
| bc = core bus controller | sh = SHA acceleration | ic = interrupt control |
| pb = peripheral bus controller. | | m = random number gen. |
| bu = bus interface unit | ss = System Services | ee = EEPROM controller |
| vm = VM32A core | rc = real time clock | pc = PCMCIA controller |
| ro = ROM | ra = RAM | mm = memory management |
| ex = external memory | | |

| Name | Width | Class | Source | Description |
|---|---|---|---|---|
| rst | scalar | 1s | SS | system reset |
| phi1 | scalar | clock | SS | phase 1 of clock |
| phi2 | scalar | clock | SS | phase 2 of clock |
| gad | [31:0] | 1s | bus master | global address bus |
| gbe | [3:0] | 1s | bus master | global byte enable |
| gdt | [31:0] | 2v/1s | master/slave | global data bus |
| gta_z | scalar | 2p | bus master | global Ta of new transaction |
| grd | scalar | 1s | bus master | global read |
| gwr | scalar | 1s | bus master | global write |
| vmst | [2:0] | 1s | VM32A | VM32A status (type) of trans. |
| gpwait_z | scalar | 1p | slaves/CBC | WAIT; shared, precharged first cycle of wait is always generated by CBC |
| bc_rdy | scalar | 2s | CBC | ready, transaction completed |
| sh_bsy,ex_bsy, ss_bsy | scalar | 1s | slaves | busy |
| bc_hold | scalar | 2s | CBC | hold request to core |
| vmhlda | scalar | 1s | VM32A | hold acknowledge to CBC |
| mu_mbrq | scalar | 1s | multiplier | DMA request |
| bc_mu_bms | scalar | 2s | CBC | multiplier bus master select |
| bc_cs_xx | scalar | 1s | CBC | chip select for slaves; replace xx with the 2 letter block designation |
| bc_cs_ro | | | | ROM (fast chip select) |
| bc_cs_ra | | | | RAM (fast chip select) |
| bc_cs_mu | | | | MU multiplier (fast chip select) |
| bc_cs_sh | | | | SH secure hash algorithm |
| bc_cs_mm | | | | MM memory management unit |
| bc_cs_bu | | | | BU bus interface unit |
| bc_cs_ss | | | | SS system services |
| bc_cs_pc | | | | PC PCMCIA controller |
| bc_cs_rc | | | | RC real time clock |
| bc_cs_ic | | | | IC interrupt controller |
| bc_cs_rn | | | | RN random number generator |
| bc_cs_ee | | | | EE EEPROM controller |
| bc_cs_ex | | | | external memory |
| bc_cs_ct | | | | CT command timer |
| bc_cs_rsv1C, bc_cs_rsv44, bc_cs_rsv48, bc_cs_rsv4C | | | | Reserved core bus chip selects. |
| bc_cs_rsv38, bc_cs_rsv3C, bc_cs_rsv50, bc_cs_rsv54, bc_cs_rsv58 | | | | Reserved peripheral bus chip selects. |

...tional Semiconductor Corporation

Core Capacitance Loading Requirements

The following requirement is derived from the VM32A core bus specification by dividing the CLoad requirements evenly across all core bus modules.

Masters: multiplier: 1 master

Slaves: bus interface unit, peripheral bus controller, RAM (1), ROM (1), MMU, SHA, : 7 slaves The following load table will support 8 (1 master/7 slaves) for a maximum VM32 core bus system.

| Signal | CLoad (per) | Routing (total) | Ctotal |
|---|---|---|---|
| gad [25:0] | 400 fF | 2.0 pF | 6.00 pF |
| gad [31:26] | N/A | 1.2 pF | 1.70 pF |
| gdt [31:0] | 425 fF (in/out) | 2.0 pF | 6.00 pF |
| gbe [3:0] | 275 fF | 2.0 pF | 4.00 pF |
| gta_z | 325 fF | 3.0 pF | 6.00 pF |
| other | | | |
| controls | 325 fF | 3.0 pF | 6.00 pF |
| DMA signals | 500 fF (max 3) | 2.0 pF | 3.50 pF |

Core Bus Slave Interface

A zero wait slave must set the busy status signal to the CBC to delay access by a master. If the busy line is not active prior to phi1 of the Tb cycle, the unit must accept the transaction as zero wait states. This interface supports pipelined accesses.

The core elements which are 1 wait state or more guarantee that gpwait_z is driven low by a qualified phi1 in the second Tbw cycle of the transaction.

Memory Map

The core bus address blocks (gad upper nibble) are 0, 1 and 4. The peripheral bus address blocks are 2, 3, 5 and F.

| Module | Start Address | End Address |
|---|---|---|
| ROM | 00000000 | 03FFFFFF* |
| RAM | 04000000 | 07FFFFFF |
| Multiplier | 08000000 | 0BFFFFFF |
| Secure Hash Algorithm | 0C000000 | 0FFFFFFF |
| | 10000000 | 13FFFFFF |
| BIU | 14000000 | 17FFFFFF |
| MMU | 18000000 | 1BFFFFFF |
| Reserved | 1C000000 | 1FFFFFFF |
| PCMCIA | 20000000 | 23FFFFFF |
| Real Time Clock | 24000000 | 27FFFFFF |
| EEPROM | 28000000 | 2BFFFFFF |
| Random Number Generator | 2C000000 | 2FFFFFFF |
| System Services | 30000000 | 33FFFFFF |
| Command Timer | 34000000 | 37FFFFFF |

Rev. 1.0.4

| Module | Start Address | End Address | |
|---|---|---|---|
| Reserved | 38000000 | 3BFFFFFF | |
| Reserved | 3C000000 | 3FFFFFFF | |
| External Memory | 40000000 | 43FFFFFF | |
| Reserved | 44000000 | 47FFFFFF | |
| Reserved | 48000000 | 4BFFFFFF | |
| Reserved | 4C000000 | 4FFFFFFF | |
| Reserved | 50000000 | 53FFFFFF | |
| Reserved | 54000000 | 57FFFFFF | |
| Reserved | 58000000 | 5BFFFFFF | |
| ICU | FFFFFE00 | FFFFFEFF | (maskable interrupts) |

* bits 25:24 are not part of the decode for CS

Core Wait State Assignments For Slaves

| Block | Wait designation | Signal interface |
|---|---|---|
| RO | always 0 | n/a |
| RA | always 0 | n/a |
| MU | always 0 | n/a |
| SH | always 0 unless busy | sh_bsy |
| EX | always 0 unless busy | ex_bsy |
|  | always 0 | n/a |
| MM | always 0 | n/a |
| SS | always 1 unless busy | ss_bsy |
| PB | at least 1 wait state | gpwait_z |

3.2.3.2 Peripheral Bus Signal List

Naming convention:

- first letter or first and second letter designate source of signal g = global
bc = core bus controller
pb = peripheral bus controller.
bu = bus interface unit
vm = VM32A core
ro = ROM
ex = external memory mu = multiplier
sh = SHA acceleration ss = System Services
rc = real time clock
ra = RAM ct = command timer
ic = interrupt control
m = random number gen.
ee = EEPROM controller
pc = PCMCIA controller
mm = memory management

| Name | Width | Class | Source | Description |
|---|---|---|---|---|
| rst | scalar | 1s | SS | system reset |
| phi1 | scalar | clock | SS | phase 1 of clock |
| phi2 | scalar | clock | SS | phase 2 of clock |
| pbad | [10:0] | 2s | PBC | peripheral address |
| pbdt | [15:0] | 2v | core/periph | peripheral data bus | nal Semiconductor Corporation                                                                any Private

| Name  | Width  | Class | Source | Description            |
|-------|--------|-------|--------|------------------------|
| pbads | scalar | 1s    | PBC    | address strobe         |
| pbrd  | scalar | 2s    | PBC    | read                   |
| pbwr  | scalar | 1s    | PBC    | write                  |
| pboe  | scalar | 2s    | PBC    | output enable for reads |

Peripheral Capacitance Loading Requirements

The following requirements are derived from the Standard Peripheral Bus specification Rev 1.09 dated June 9, 1994.

Maximum clients:

The maximum number of peripheral which can be connected to the PB bus is 15. This includes the PBC.

Connection:

Each peripheral receives and/or drives each signal with a single load.

Capacitance:

| Signal  | CLoad (per)     | Routing (total) | Ctotal  |
|---------|-----------------|-----------------|---------|
| pbad    | 100 fF          | 2.5 pF          | 4.00 pF |
| pbdt    | 150 fF (in/out) | 2.2 pF          | 4.45 pF |
| control | 100 fF          | 2.0 pF          | 3.50 pF |

3.2.3.3 Memory Management Unit

General Description

The MMU provides supporting circuitry for two domains of code execution arranged in a hierarchical fashion in order to meet security requirements of the           project. The two domains of execution are defined as Kernel and Supervisor. The MMU prevents read and write accesses attempted by software executing in a lower domain than has been assigned by the kernel to the address space under access. The MMU also notifies the kernel, via an NMI, that a domain access violation has occurred.

Functional Description

The MMU implements the security domains via three (3) mechanisms:

1. A protected copy of the INTBASE register is kept in the MMU. Upon detection of an exception, the upper address [31:7] supplied by the VM32A for the Interrupt Dispatch Table (IDT) is overridden by the MMU. Additionally, the address of the IDT is compared to the protected INTBASE on each exception call. A miscompare will set the IB_viol bit in the MM_STATUS register.

2. The current security level is maintained by the MMU. The security level can only be changed via software by the kernel. Each VM32A exception pushes the current security level onto an eight entry stack and then sets the current security level to kernel. Each programmed exception return pops the security level stack, thus returning the current security level to its previous state.

3. Each addressable block has a programmable security level access. On power up, all resources are locked to kernel access only.

All register write accesses to the MMU require an unlock code to be written to a specific MMU unlock register immediately prior to writing an MMU register. If the unlock access is not performed, the write command will be ignored.

The addresses generated by the Multiplier block as a bus master are controlled by the Master Address register in the MMU. The upper 6 bits of gad, which control the block chip selects, are driven from the MM_MADDR register, and the Multiplier engine drives the lower 26 bits of the address. In order to prevent a domain violation, the current security mode must be equal or higher priority than both the multiplier and the block selected by MM_MADDR while the multiplier is running.

Interface Description

| Name | Width | Class | Source | Dir | Description |
|---|---|---|---|---|---|
| rst | scalar | 1s | SS | I | system reset |
| phi1 | scalar | clock | SS | I | phase 1 of clock |
| phi2 | scalar | clock | SS | I | phase 2 of clock |
| vmad | [31:0] | 1s | VM32A | I | address bus direct from VM32 |
| gad | [25:0] | 1s | MMU | I/O | address from MMU; post checks |
| gta_z | scalar | 2p | bus master | I | global Ta of new transaction |
| grd | scalar | 1s | bus master | I | global read |
| gwr | scalar | 1s | bus master | I | global write |
| vmst | [2:0] | 1s | VM32A | I | type of transaction |
| bc_cs_mm | scalar | 1s | CBC/MMU | I | chip select for MMU registers |
| mm_int | scalar | 2s | MMU | O | level sensitive interrupt to ICU |
| mm_blkint | scalar | 2s | MMU | O | interrupt block signal; active from RETX indicator to execution of non-sequential instruction |

Register Definition

| Register | A[9] | A[5:0] | Suggested | R/W | Width (bits) |
|---|---|---|---|---|---|
| MM_UNLOCK * | 0 | 000000 | 000h | w | 8 |
| MM_STATUS | 0 | 000100 | 004h | r | 8 |
| MM_MODESWITCH | 0 | 001000 | 008h | w | 8 |
| MM_STACK | 0 | 001100 | 00Ch | r/w | 8 |
| MM_STACKPTR | 0 | 010000 | 010h | r/w | 8 |
| MM_INTBASE | 1 | 000000 | 200h | r/w | 32 |
| MM_PROTECT0 | 1 | 000100 | 204h | r/w | 8 |
| MM_PROTECT1 | 1 | 001000 | 208h | r/w | 8 |
| MM_PROTECT2 | 1 | 001100 | 20Ch | r/w | 8 |
| MM_VIOLADD | 1 | 010000 | 210h | r | 32 |
| MM_VIOLDAT | 1 | 010100 | 214h | r | 32 |
| MM_VIOLACT | 1 | 011000 | 218h | r | 8 |
| MM_MADDR | 1 | 011100 | 21Ch | r/w | 8 |
| MM_PROTECT_CK0 | 1 | 100000 | 220h | r | 8 |

| Register | A[9] | A[5:0] | Suggested | R/W | Width (bits) |
|---|---|---|---|---|---|
| MM_PROTECT_CK1 | 1 | 100100 | 224h | r | 8 |
| MM_PROTECT_CK2 | 1 | 101000 | 228h | r | 8 |

The MM_UNLOCK register is fully decoded using Gad[25:0] to minimize the possibility of inadvertently unlocking the MMU register set.

MM_UNLOCK (Unlock Key for Write Access)

address 000h; write only

An unlock code of '6Ah' must be written to this register immediately prior to any write access to other MMU registers. This register may be written any number of times prior to the access to the next MMU address. The completion of any write cycle, except to MM_UNLOCK, will relock write accesses to the MMU. This register has no effect on reads.

MM_STATUS (Status of MMU)

address 004h; read only (and clear operation)

Note: Bits 4-1 are cleared by writing a '1' to the appropriate set bit. Writing to bit 0 has no affect at any time.

Description

| D7 | D6 | D5 | D4 | D3 | D2 | D1 | D0 |
|---|---|---|---|---|---|---|---|
| Resv | Resv | Resv | HWF | SOVF | IB_viol | Add_viol | Mode |
| N/A | N/A | N/A | 0 | 0 | 0 | 0 | 0 | reset condition Bits 7-5: Resv — Reserved. Write has no effect, read as 0.

Bit 4: HWF — Hardware fault. Set if the MMU detects a miscompare in the redundancy check logic. This bit must be cleared in order to reset activation of the interrupt.

Bit 3: SOVF — Security level stack overflow. Set if the exception stack depth exceeds 8; this bit must be cleared in order to reset activation of the interrupt. Writing a one to this bit will reset the MM_STACKPTR to the empty state.

Bit 2: IB_viol — INTBASE Violation. Set if the MMU detects that the INTBASE sourced by the VM32 during exception handling is different from the protected value stored in the MM_INTBASE register. This bit does not cause the MM_int_p to activate. All exception handlers should read the MM_STATUS and VM INTBASE register on entry (See Programmer's Model).

Bit 1: Add_viol. Address Domain Violation. Set if an access is made to a protected address block from a lower security level. This bit must be cleared in order to reset activation of the associated interrupt.

Bit 0: Mode  Current Security Level; write has no effect
    0  Kernel
    1  Supervisor MM_int_p = Add_viol + SOVF + HWF National Semiconductor Corporation  Company Private

MM_MODESWITCH (Switch Security Mode to Pop'd Value)

address 008h; write only; DATA MUST BE 'B5h'

This register serves as a software indication of a pending non-sequential instruction which is intended to pop the stack to set a new security mode or return to the previous security mode after processing an exception. The detection of the non-sequential instruction execution will cause the security mode to be popped from the stack and loaded into the current mode indicator which is located in the MM_STATUS register. Several instructions cause a non-sequential instruction fetch: Bcond, BAL, BR, EXCP, Jcond, JAL, JUMP, RETX and LPR. Bcond or Jcond cause a non-sequential instruction fetch only if the condition is met.

Writing this register will also cause the activation of the output signal 'mm_blkint'. This signal to the ICU will block activation of all interrupts to the VM32, including non-maskable interrupts. mm_blkint is cleared when the MMU detects the non-sequential instruction fetch. IT IS CRITICAL THAT THE MM_MODESWITCH REGISTER IS ONLY WRITTEN IMMEDIATELY PRIOR TO EXECUTION OF A NON-SEQUENTIAL INSTRUCTION TO LIMIT THE POTENTIAL INTERRUPT LATENCY CAUSED BY THE BLOCK SIGNAL.

MM_STACK (Security Mode Stack)

address 00Ch; read/write

Description

| D7 | D6 | D5 | D4 | D3 | D2 | D1 | D0 |
|---|---|---|---|---|---|---|---|
| Resv | Resv | Resv | Resv | Resv | Resv | Resv | Mode |
| N/A | N/A | N/A | N/A | N/A | N/A | N/A | 1 | reset condition

Bits 7-1: Resv — Reserved.

Bit 0: Mode — Security mode of the top of the stack. Reads pop the stack and writes push the stack. CAUTION: reading the stack when it is empty will cause the SOVF MMU exception.

Stack operations:

1. reset

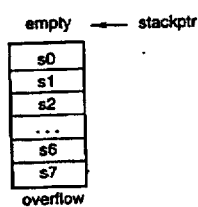
empty ← stackptr
s0
s1
s2
...
s6
s7
overflow

2. An exception occurs
mode (i) <= MM_STATUS[0]
MM_STATUS[0] <= 0

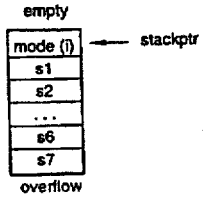
empty
mode (i) ← stackptr
s1
s2
...
s6
s7
overflow 3. 2nd exception
mode (j) <= MM_STATUS[0]
MM_STATUS[0] <= 0

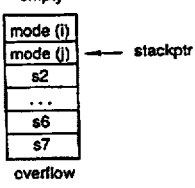
empty
mode (i)
mode (j) ← stackptr
s2
...
s6
s7
overflow 4. write MODESWITCH, then exec. nonseq. instr.
MM_STATUS[0] <= mode (j)

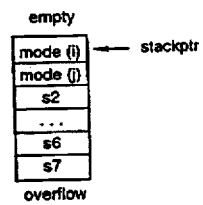
empty
mode (i) ← stackptr
mode (j)
s2
...
s6
s7
overflow 5. write MODESWITCH, then exec. nonseq. instr.
MM_STATUS[0] <= mode (i)

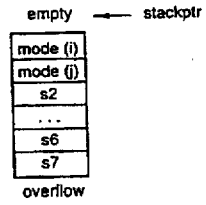
empty ← stackptr
mode (i)
mode (j)
s2
...
s6
s7
overflow 6. read MM_STACK
(causes interrupt)
MM_STATUS[3] <= 1
mm_int <= 1
gdt[0] <= 1

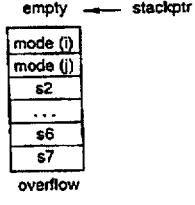
empty ← stackptr
mode (i)
mode (j)
s2
...
s6
s7
overflow 7. write MM_STACK
mode (n) <= gdt[0]

empty

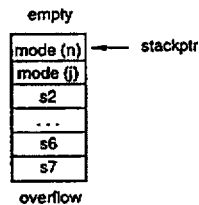 ← stackptr overflow 8. read MM_STACK
gdt[0] <= mode(n)

empty ← stackptr

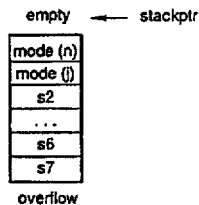

overflow 9. overflow stack before exception/write empty

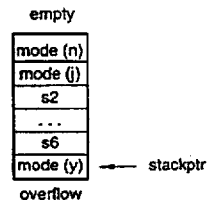 ← stackptr overflow after exception/write
MM_STATUS[3] <=1
mm_int <=1
lost <= mode (z)

empty

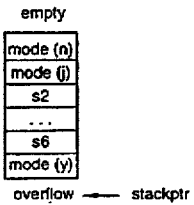 ← stackptr overflow ← stackptr 10. popping overflow stack
via return after write to modeswitch MM_STATUS[0] <= '1' (supervisor)

empty

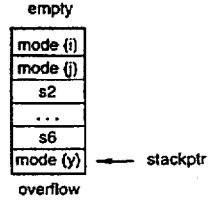 ← stackptr overflow 11. popping an empty stack write MODESWITCH
then execute nonsequential instruction MM_STATUS[0] <= '1' (supervisor)
MM_STATUS[3] <= 1
mm_int <= 1 empty ← stackptr

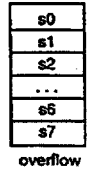

overflow

MM_STACKPTR address 010h; read/write

Description

| D7 | D6 | D5 | D4 | D3 | D2 | D1 | D0 |
|---|---|---|---|---|---|---|---|
| Resv | Resv | Resv | Resv | emp/ovf | Ptr2 | Ptr1 | Ptr0 |
| N/A | N/A | N/A | N/A | 1 | 1 | 1 | 1 | reset condition

Reading this register returns the current security stack pointer. Writing this register modifies the current security stack pointer.

Bits 7-4: Resv — Reserved.

Bit 3: emp/ovf — Empty/overflow indication. '0' indicates the security stack contains valid data. '1' and Ptr[2:0]=='111' indicates the stack is empty. '1' and Ptr[2:0]=='000' indicates the stack is in an overflow condition.

Bits 2-0: Ptr[2:0] — Stack pointer.

Notes:
1. Continuing to push onto the stack for any reason after an overflow condition has occurred does not increment the Ptr value; Ptr remains '000'.
2. Continuing to pop an empty stack does not decrement the Ptr value. Ptr remains '111'.
3. The data popped from an empty or overflowed security stack is always '1' which is Supervisor mode.
4. Clearing the SOVF bit in MM_STATUS resets the MM_STACKPTR register to the empty state.
5. Reading an overflowed stack decrements the stack pointer and clears the SOVF bit in MM_STATUS.

MM_INTBASE (Protected Interrupt Base Address)

address 200h; read/write

Description

| D31 | | | | | | | D8 |
|---|---|---|---|---|---|---|---|
| data | | | | | | | |

| D7 | D6 | D5 | D4 | D3 | D2 | D1 | D0 |
|---|---|---|---|---|---|---|---|
| data | Resv | Resv | Resv | Resv | Resv | Resv | Resv | reset condition = 00000100h

The protected interrupt base address duplicates the function of the VM32A INTBASE register but does so in a protected environment. The security mechanism requires that the lower 7 bits of the VM32A's INTBASE are '0' with the upper 25 bits held to a constant value by the firmware. On each access to the IDT, the upper 25 bits of the address bus are intercepted by the MMU and are sourced from MM_INTBASE[31:7]. The lower 7 bits flow through from the VM32A address. If the upper 25 bits of the address sourced during an IDT access differ from the MM_INTBASE[31:7] value, the 'IB_viol' bit is set in the MM_STATUS register.

The address calculation for the IDT entry is INTBASE + (vector * 4). In the Keystone the vector is constrained to the range 0h -> 17h by the Interrupt Control Unit. This vector range supports all traps, the NMI, and eight maskable interrupts.

Note that it is possible for any software to modify the VM's INTBASE register. If the software sets the lower 7 bits to a non zero value, then the VM32A will fetch an incorrect entry from the Dispatch Table in memory. This occurs because the VM32A calculates the IDT entry as VM32A INTBASE + (vector * 4). The MMU then replaces ONLY the upper 25 bits of the IDT address with its MM_INTBASE value. Since the lower 7 bits are not referenced to a zero value, the wrong IDT entry is fetched. Thus, Dispatch Tables must be defined with 32 valid entries. Each exception handling routine must test the lower 7 bits of the VM32A's INTBASE register for zero to ensure that the correct IDT entry has been fetched.

National Semiconductor Corporation                                    Company Private

MM_PROTECT0 (block by block security level definition)

address 204h; read/write

Description

| D7 | D6 | D5 | D4 | D3 | D2 | D1 | D0 |
|----|----|----|----|----|----|----|----|
| b1C | b18 | b14 | b10 | b0C | b08 | b04 | b00 |
| 0 | 0 | 0 | 0 | 0 | 0 | 0 | 0 | reset condition

MM_PROTECT_CK0 address 220h; read only

Description

| D7 | D6 | D5 | D4 | D3 | D2 | D1 | D0 |
|----|----|----|----|----|----|----|----|
| b1C | b18 | b14 | b10 | b0C | b08 | b04 | b00 |
| 0 | 0 | 0 | 0 | 0 | 0 | 0 | 0 | reset condition

Redundant copy of the security protect register which can be used by software to verify correctness of protection logic.

MM_PROTECT1 (block by block security level definition)

address 208h; read/write

Description

| D7 | D6 | D5 | D4 | D3 | D2 | D1 | D0 |
|----|----|----|----|----|----|----|----|
| b3C | b38 | b34 | b30 | b2C | b28 | b24 | b20 |
| 0 | 0 | 0 | 0 | 0 | 0 | 0 | 0 | reset condition

MM_PROTECT_CK1 (block by block security level definition)

address 224h; read only

Description

| D7 | D6 | D5 | D4 | D3 | D2 | D1 | D0 |
|----|----|----|----|----|----|----|----|
| b3C | b38 | b34 | b30 | b2C | b28 | b24 | b20 |
| 0 | 0 | 0 | 0 | 0 | 0 | 0 | 0 | reset condition

Redundant copy of the security protect register which can be used by software to verify correctness of protection logic.

MM_PROTECT2 (block by block security level definition)

address 20Ch; read/write

Description

| D7 | D6 | D5 | D4 | D3 | D2 | D1 | D0 |
|----|----|----|----|----|----|----|----|
| bFF | b58 | b54 | b50 | b4C | b48 | b44 | b40 |
| 0 | 0 | 0 | 0 | 0 | 0 | 0 | 0 | reset condition

Rev. 1.0.4

MM_PROTECT_CK2 (block by block security level definition)

address 228h; read only

Description

| D7 | D6 | D5 | D4 | D3 | D2 | D1 | D0 |
|---|---|---|---|---|---|---|---|
| bFF | b58 | b54 | b50 | b4C | b48 | b44 | b40 |
| 0 | 0 | 0 | 0 | 0 | 0 | 0 | 0 | reset condition

Redundant copy of the security protect register which can be used by software to verify correctness of protection logic.

For Keystone, the following table defines the memory block to module mapping:

| Register | Bits | Label | Module |
|---|---|---|---|
| MM_PROTECT0 | 0 | block00 | ROM |
| MM_PROTECT0 | 1 | block04 | RAM |
| MM_PROTECT0 | 2 | block08 | Multiplier |
| MM_PROTECT0 | 3 | block0C | Secure Hash Accelerator |
| MM_PROTECT0 | 4 | block10 | |
| MM_PROTECT0 | 5 | block14 | BIU |
| MM_PROTECT0 | 6 | block18 | MMU |
| MM_PROTECT0 | 7 | block1C | reserved (no associated module) |
| MM_PROTECT1 | 0 | block20 | PCMCIA |
| MM_PROTECT1 | 1 | block24 | Real Time Clock |
| MM_PROTECT1 | 2 | block28 | EEPROM |
| MM_PROTECT1 | 3 | block2C | Random Number Generator |
| MM_PROTECT1 | 4 | block30 | System Services |
| MM_PROTECT1 | 5 | block34 | Command Timer |
| MM_PROTECT1 | 6 | block38 | reserved (no associated module) |
| MM_PROTECT1 | 7 | block3C | reserved (no associated module) |
| MM_PROTECT2 | 0 | block40 | External Memory |
| MM_PROTECT2 | 1 | block44 | reserved (no associated module) |
| MM_PROTECT2 | 2 | block48 | reserved (no associated module) |
| MM_PROTECT2 | 3 | block 4C | reserved (no associated module) |
| MM_PROTECT2 | 4 | block 50 | reserved (no associated module) |
| MM_PROTECT2 | 5 | block 54 | reserved (no associated module) |
| MM_PROTECT2 | 6 | block 58 | reserved (no associated module) |
| MM_PROTECT2 | 7 | blockFF | Interrupt Controller |

MM_VIOLADD (Violation Address)

address 210h; read only

Description

| D31 | D30 | ... | D4 | D3 | D2 | D1 | D0 |
|---|---|---|---|---|---|---|---|
| data | data | data | data | data | data | data | data |
| x | x | x | x | x | x | x | x | reset condition

This register holds the address issued during the bus cycle which caused the memory domain violation interrupt.

MM_VIOLDAT (Violation Data)

address 214h; read only

Description

| D31 | D30 | ... | D4 | D3 | D2 | D1 | D0 |
|---|---|---|---|---|---|---|---|
| data | data | data | data | data | data | data | data |
| x | x | x | x | x | x | x | x | reset condition

If the domain violation was caused by a write cycle, this register will contain the data which was sourced for the write command. All 32 bits of the data bus are stored regardless of the transaction size.

MM_VIOLACT (Violation Action)

address 218h; read only

Description

| D7 | D6 | D5 | D4 | D3 | D2 | D1 | D0 |
|---|---|---|---|---|---|---|---|
| Resv | Resv | BE3 | BE2 | BE1 | BE0 | R/W | Mode |
| x | x | x | x | x | x | x | x | reset condition

Bits 7, 6:   Resv — Reserved.

Bits 5-2:   BE[3:0] — Core bus byte enables for transaction

Bit 1:   R/W — 1 = Read, 0 = Write

Bit 0:   Mode0  Security Mode at the time of the domain violation
         0      supervisor
         1      user

MM_MADDR address 220h; read/write

Description

| D7 | D6 | D5 | D4 | D3 | D2 | D1 | D0 |
|---|---|---|---|---|---|---|---|
| Resv | Resv | Ggad31 | Ggad30 | Ggad29 | Ggad28 | Ggad27 | Ggad26 |
| 0 | 0 | 0 | 0 | 0 | 0 | 0 | 1 | reset condition

During bus master cycles (VM_hlda = 1), this register is driven onto Ggad[31:26] to form the block address. The lower 26 bits of the address are sourced by the bus master.

Programmer's Model

Writing registers in the MMU:

1. Disable maskable interrupts.
2. Write 6Ah to MM_UNLOCK.
3. Write desired data to register.
   2a. Write accesses automatically lock on completion of load.
4. Repeat 2-3 for additional register writes.
5. Enable maskable interrupts.

Setting the protection level for blocks:

1. In kernel mode, read MM_PROTECT.
2. Modify desired block protection levels.
3. Disable maskable interrupts.
4. Write 6Ah to MM_UNLOCK.
5. Write modified protect byte to MM_PROTECT.
6. Enable maskable interrupts.

Setting INTBASE:

1. Disable all interrupts.
2. Write INTBASE register in VM32A; 7 least significant bit must be 0.
3. Write 6Ah to MM_UNLOCK.
4. Write INTBASE to MM_INTBASE.
5. Enable all interrupts.

Responding to violations:

1. Inspect lower 7 bits of the VM32A INTBASE register. If not zero then an incorrect exception routine has been fetched. Handle as software policy dictates.
2. Inspect the interrupt stack pointer (ISP). If incorrect, adjust as software policy dictates.
3. If desired, inspect MM_Status for "IB_viol" to detect IDT address mismatches, reacting as software policy dictates.
4. Poll ICU to determine cause of Non-maskable interrupt; if MMU domain violation continue here.

Note: the current security level (MM_STATUS[0]) has been set by the MMU to kernel mode (0) upon detection of the exception.

5. Read MM_STATUS to determine what type of error has occurred.
6. If 'Add_viol' is set, read MM_VIOLADD, MM_VIOLDAT, and MM_VIOLACT.

6a. Write 6Ah to MM_UNLOCK.

6b. Write a 1 to the Add_viol bit of the MM_STATUS reg. This "empties" the MMU's security level stack.

6c. Handle as software policy dictates.

Important Note: All VM general purpose registers and any other device capable of DMAing must be cleared at this time for security reasons. While the MMU does block access to the intended target address during an address violation, the MMU does NOT keep the VM (or DMAing device) from reading the data bus. Thus, the information on the keepers of the data bus would be available to the offending software unless all general purpose VM registers and all DMA devices are cleared.

National Semiconductor Corporation                                                                            Company Private 6d. Write 6Ah to MM_UNLOCK.

6e. Write B5h to MM_MODESWITCH, followed by the RETX instruction to return if the offending software is allowed to regain control.

7. If 'SOVF' is set then the security level of the software that generated the exception has been lost. Either allow the MMU to default to Supervisor level upon return, or reset the security level stack and the system. To reset the security level stack:

7a. Write 6Ah to MM_UNLOCK.

7b. Write a 1 to the SOVF bit of the MM_STATUS register to clear the NMI source.

7c. Adjust the stack as software policy dictates.

7d. Write 6Ah to MM_UNLOCK.

7e. Write B5h to MM_MODESWITCH, followed by the RETX instruction to return if the offending software is allowed to regain control.

A note on SOVF: Since any exception condition could cause this, allowing the MMU to default to supervisor level upon return is unwise, as the return may be to an interrupted exception handler in the Kernel's protected memory, thus producing an "Add_viol" exception.

To move from Kernel security level to supervisor security level:

1. Disable maskable interrupts.
2. Write 6Ah to MM_UNLOCK.
3. Push the supervisor security level onto the security level stack by writing it to MM_STACK.
4. Write 6Ah to MM_UNLOCK.
5. Write B5h to MM_MODESWITCH.
6. Call or Jump to the location of the supervisor security level code. The supervisor security level is popped off the security stack and is now in force.
7. Enable maskable interrupts.

To move from supervisor security level to kernel level:

The only way to raise the current security level is to cause a VM32A exception. Typically this will be through an SVC trap instruction. The level will automatically be raised to kernel mode.

1. Set General purpose register with SVC call parameters.
2. SVC -- VM32A generates an SVC Trap exception. The MMU switches to kernel security level. The MMU forces the protected IDT address.
3. The Kernel SVC handler inspects the lower 7 bits of the VM32A INTBASE register for zero to ensure it was appropriately called.
4. The kernel SVC handler inspects the ISP and, if incorrect, adjusts it as software policy dictates.
5. If desired, inspect MM_Status for "IB_viol" to detect IDT address mismatches, reacting as software policy dictates.
6. The kernel now performs the desired function for the supervisor code, if software policy allows.
7. The kernel writes the results into one or more general purpose registers and supervisor memory if necessary.
8. Write 6Ah to MM_UNLOCK.
9. Write B5h to MM_MODESWITCH, followed by the RETX instruction to return from the SVC trap. The supervisor security level is popped off the security level stack and is again in force.

Rev. 1.0.4                              43

Reset State

As detailed in the register definitions, the MMU powers up in kernel mode with all addressable assets protected.

3.2.4 Test Specifications

The MMU will be tested in all modes and with all assets in all modes. The mode stack can be written and read directly for test purposes.

3.2.5 Security Specifications

No single software or hardware failure will cause the MMU to allow low priority access to protected resources.

3.2.6 Performance Specifications

The MMU will be designed in conjunction with the core bus controller to minimize the impact of the MMU function on the Keystone max operating frequency.

3.2.7 Bus Element Timing Diagrams

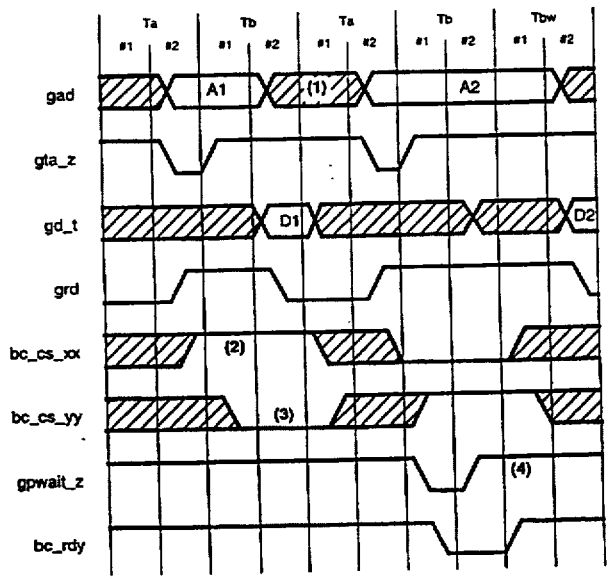

(1) gad is held by bus keepers
(2) bc_cs_xx is a fast core chip select with setup to phi1 rising edge
(3) bc_cs_yy is always one wait state chip select
(4) Wait cycle generated by CBC

FIGURE 14. Core Bus Controller Read Transactions

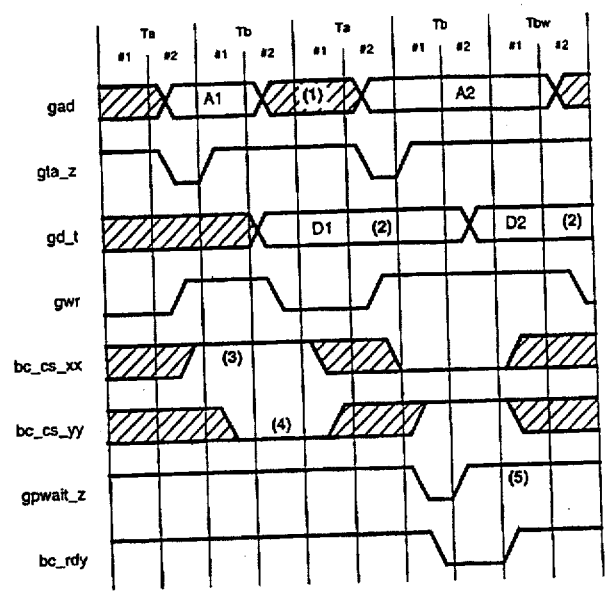
(1) Gad is held by bus cheaters
(2) Gdt is driven by a last-value latch in the VM32A
(3) bc_cs_xx is a fast core chip select with setup to phi1 rising edge
(4) bc_cs_yy is always one wait state (slow) chip select
(5) Wait cycle generated by CBC
FIGURE 15. Core Bus Controller Write Transactions

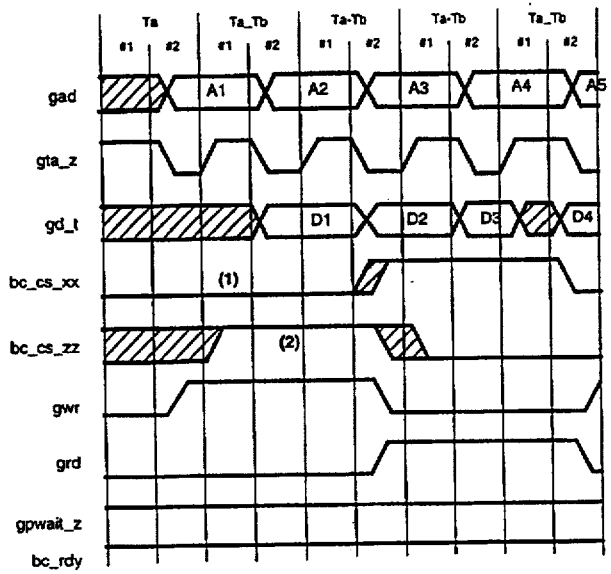
FIGURE 16. Pipelined Core Bus Operations

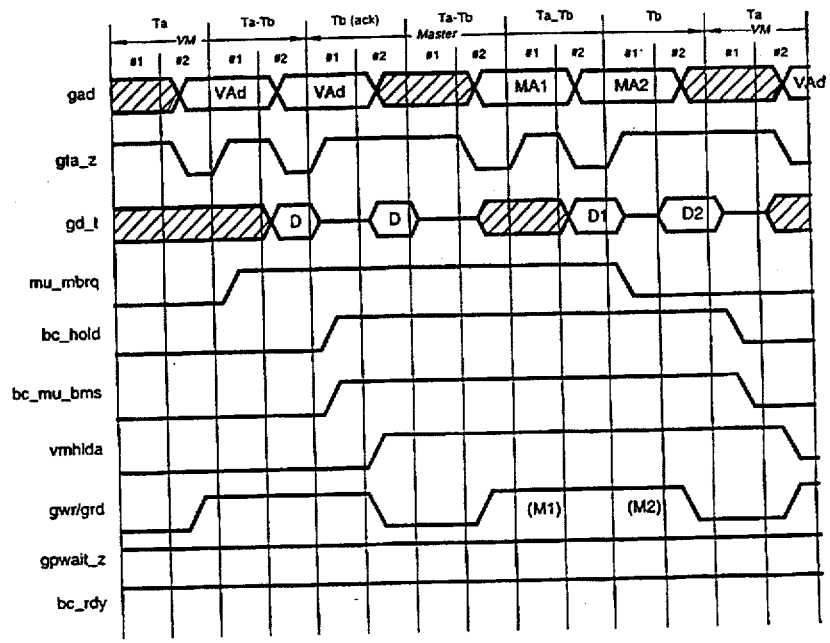
FIGURE 17. Core Bus Controller Hold Acknowledge Cycles — Multiplier as Master

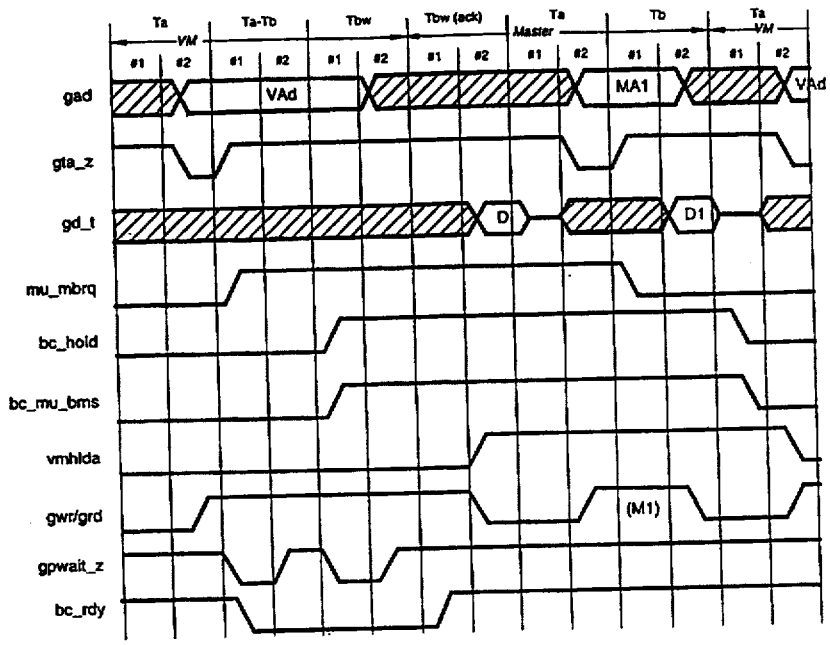
FIGURE 18. Core Bus Controller Hold Acknowledge Cycle — Extended Bus Cycle National Semiconductor Corporation  Company Private
Core Bus Controller Implementation Notes
The gpwait_z phi2 driver is implemented in the CBC block.
gad keepers are in the CBC block. gbe, grd, gwr, and gd_t keepers are implemented in the VM32A core.
The CBC block is responsible to sample the address during the Ta cycle and keep it stable if bc_rdy is deasserted.
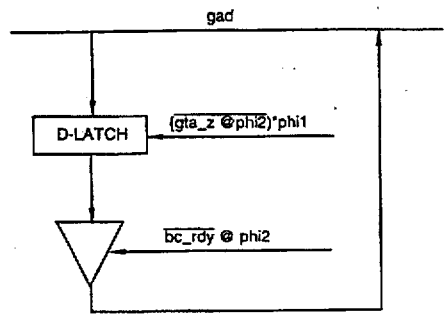

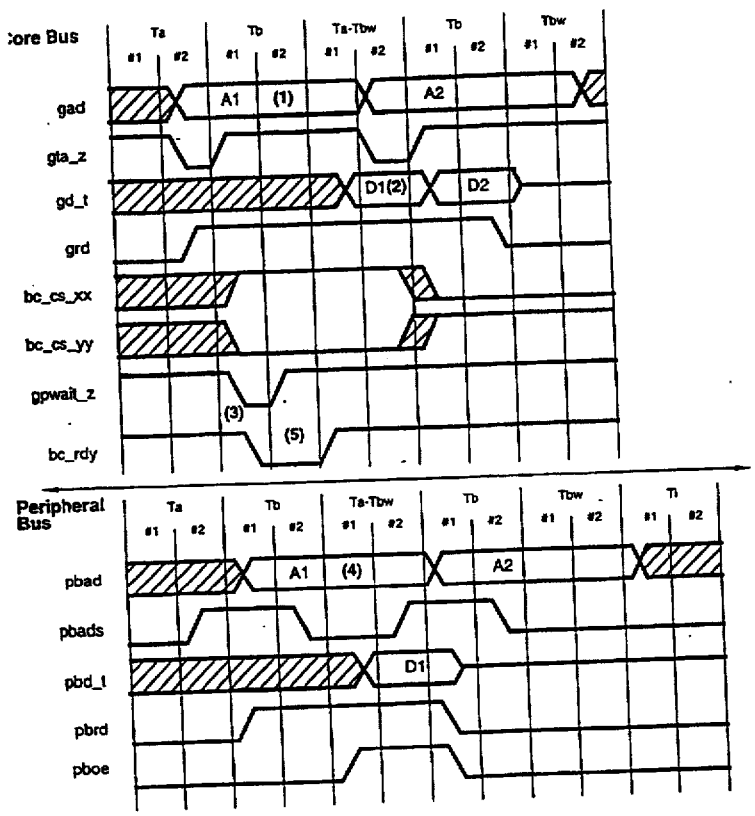
(1) Driven by CBC
(2) gd_t is driven by the PBC
(3) Driven low by CBC
(4) pbad is Gad sampled at phi1
(5) bc_rdy and gpwait_z are used in both core and peripheral accesses
FIGURE 19. Peripheral Bus Controller Read Transactions

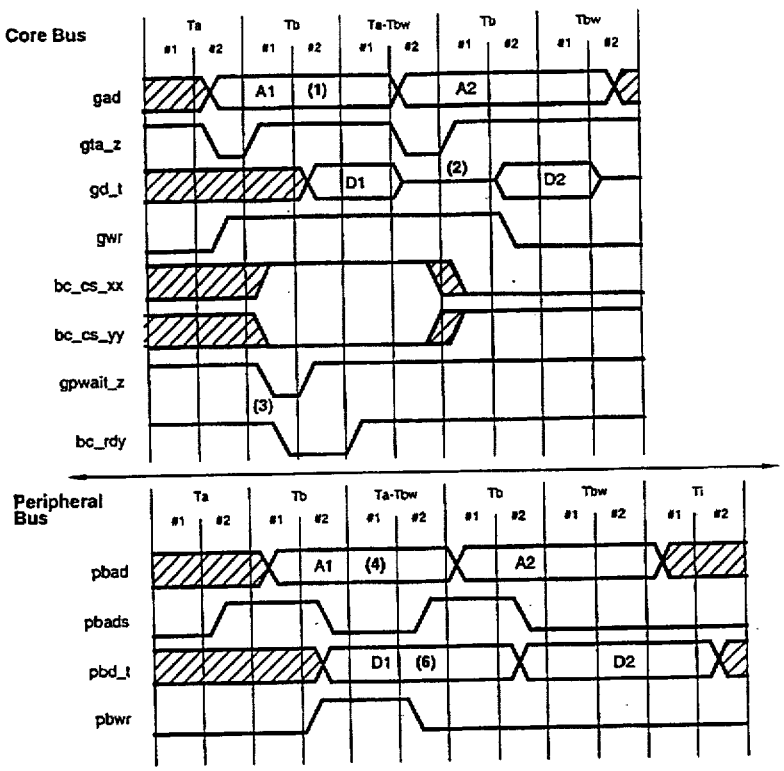
(1) Driven by CBC
(2) gd_t is driven by a last-value latch in the VM32A
(3) Driven low by CBC
(4) pbad is gad sampled at phi1
(5) pbd_t is the lower 16 bits of gd_t latched and driven by the PBC
(6) Data is clocked into the peripheral module on the rising edge of phi1 after pbwr falls
FIGURE 20. Peripheral Bus Controller Write Transactions

3.3 SRAM

3.3.1 General Description

The RAM Module contains the 768 x 32 RAM used for data storage, instruction code patches and other general use. It operates on the VM32A core bus with the ability to sustain continuous, pipelined reads and writes from a VM32A core master with no wait states.

3.3.3 Functional Description

The RAM Module contains the 768 x 32 RAM as well as the interface logic that yields maximum performance with minimum die size. The RAM module can sustain continuous, pipelined reads and writes from a VM32A core master. The RAM module supports 8-, 16- and 32-bit wide reads and writes. The RAM module operates on a VM32A core bus. The RAM module is not battery backed.

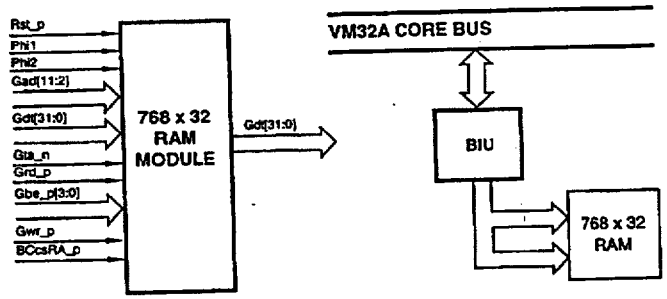

FIGURE 21. SRAM Block Diagram

3.3.3.1 Interface Signal Description

All interface signals are from the VM32A core bus. The module uses a subset of these bus signals.

| Name | Width | Class | Source | Description |
|------|-------|-------|--------|-------------|
| Rst_p | scalar | 1s | SS | system reset |
| Phi1 | scalar | clock | SS | phase 1 of clock |
| Phi2 | scalar | clock | SS | phase 2 of clock |
| Gad | [11:2] | 1s | bus master | global address bus |
| Gbe_p | [3:0] | 1s | bus master | global Byte enable |
| Gdt | [31:0] | 2v/1s | master/slave | global data bus |
| Gta_n | scalar | 2p | bus master | global Ta of new transaction |
| Grd_p | scalar | 1s | bus master | global read |
| Gwr_p | scalar | 1s | bus master | global write |

National Semiconductor  ~oration                                          Company Private

5.0 Secure Firmware Kernel

5.1 Firmware States firmware can exist in one of five states:

- Power_On
- Uninitialized
- Operational
- Sleep
- Error

After a power-on reset, the VM32A begins executing code at address 0x00000000, initializes the CPU, and enters the POWER-ON state. The Keystone will then begin a series of tests to verify that all of its functional blocks are operating correctly. If one or more tests fail, the       will enter the ERROR state. If all of the tests pass, a check will be made to determine if the EEPROM contains valid data. If the EEPROM does not contain valid data, the         will enter the UNINITIALIZED state and wait for the Write LEAF Parameters (WRLEAFP) command that will load the required data. If the EEPROM contains valid data, the         will enter the OPERATIONAL state and control will be transferred to the start of external memory (i.e., to off-chip code). If a SLEEP command is issued while in the OPERATIONAL state, the         will enter the SLEEP state. If a write operation occurs on its PCMCIA interface while in the SLEEP state, the         will return to the OPERATIONAL state.

5.2 Built In Self Test

After a power-on reset, the         enters the POWER-ON state and begins a series of tests to verify that all of its functional blocks are operating correctly. First, a series of memory tests will be performed on the ROM, EEPROM, and RAM. Next a series of cryptographic known answer tests will be performed including         ncrypt and decrypt, Secure Hash Algorithm, and Digital Signature Algorithm sign and verify. These tests will be followed by a series of randomness tests for the Random Number Generator including Monobit, Runs, and Long Runs. Data will also be collected to support a continuous Constant Value test. Finally a series of tests for other on-chip peripherals (e.g., Real Time Clock) will be performed.

5.3 Memory Management prevents code executing out of off-chip memory from accessing any on-chip memory. An implicit domain of execution is assigned to code depending on the specific memory area from which it executes.:         defines two execution domains: Kernel and Supervisor.

Code executing out of any on-chip memory is defined to be in the Kernel execution domain. This domain supports read/write access to all processor registers, all memory mapped peripherals located in on-chip and off-chip memory, and all on-chip and off-chip memory locations in the processor address space.

Code executing out of any off-chip memory is defined to be in the Supervisor execution domain. This domain supports read/write access to all processor registers, all memory mapped peripherals located in off-chip memory, and all off-chip memory locations in the processor address space. Each execution domain has its own stack located within its own protected memory space.

supports access to services or data in another execution domain only through a specific entry point called a gate. Keystone uses the vectors in the VM32A Interrupt Dispatch Table (IDT) to define these gates. A hardware circuit external to the VM32A automatically sets/clears execution domain bits.

Rev. 1.0.4

What is claimed is:

1. An exception security circuit for use with an exception-capable processor, wherein the processor, in an unsecure mode, responds to an exception by retrieving unprotected exception information from generally accessible exception information register circuitry and by executing an exception processing routine indicated by the unprotected exception information, the exception security unit comprising:

secure exception information register circuitry that holds a protected copy of the exception information;

exception detection circuitry that detects an exception and that causes the secure exception information register circuitry to provide the protected copy of the exception information to the processor in place of the unprotected exception information which would otherwise be provided to the processor from the generally accessible exception information register circuitry, such that the processor executes an exception routine indicated by the protected copy of the exception information;

current security level circuitry for holding a current security mode indication;

stack circuitry for holding a plurality of security level indications; and exception start detection circuitry for detecting an exception and, in response thereto, for pushing the current security mode indication onto the stack circuitry and for setting the indication of the current security level to a predetermined level.

2. An exception security circuit as in claim 1, and further comprising exception end detection circuitry for detecting an end to exception processing and for popping the current security level indication from the stack circuitry into the current security level circuitry.

3. An exception security circuit as in claim 2, wherein the exception end detection circuitry detects the end to exception processing by detecting a non-sequential instruction fetch of the processor.

4. An exception security circuit for use with an exception-capable processor, wherein the processor, in an unsecure mode, responds to an exception by retrieving unprotected exception information from generally accessible exception information register circuitry and by executing an exception processing routine indicated by the unprotected exception information, the exception security unit comprising:

secure exception information register circuitry that holds a protected copy of the exception information;

exception detection circuitry that detects an exception and that causes the secure exception information register circuitry to provide the protected copy of the exception information to the processor in place of the unprotected exception information which would otherwise be provided to the processor from the generally accessible exception information register circuitry, such that the processor executes an exception routine indicated by the protected copy of the exception information;

programmable circuitry associated with each of a plurality of processor-addressable memory space blocks for holding a corresponding privilege indication associated with that memory space block; and access validation circuitry that determines which of said memory space segments is being addressed by the processor and that compares the current privilege level access indication with the privilege level access indication associated with the memory space segment being addressed.

5. The exception security circuit of claim 4, wherein said access validation circuitry includes violation indication means that indicates a result of the comparison.

6. An interrupt security circuit for use with an interrupt-capable processor, wherein the processor, in an unsecure mode, responds to an interrupt by retrieving unprotected interrupt information from generally accessible interrupt information register circuitry and by executing an interrupt processing routine indicated by the unprotected interrupt information, the interrupt security unit comprising:

secure interrupt information register circuitry that holds a protected copy of the interrupt information;

interrupt detection circuitry that detects an interrupt and that causes the secure interrupt information register circuitry to provide the protected copy of the interrupt information to the processor in place of the unprotected interrupt information which would otherwise be provided to the processor from the generally accessible interrupt information register circuitry, such that the processor executes an interrupt routine indicated by the protected copy of the interrupt information;

current security level circuitry for holding a current security mode indication;

stack circuitry for holding a plurality of security level indications; and interrupt start detection circuitry for detecting an interrupt and, in response thereto, for pushing the current security mode indication onto the stack circuitry and for setting the indication of the current security level to a predetermined level.

7. An interrupt security circuit as in claim 6, and further comprising interrupt end detection circuitry for detecting an end to interrupt processing and for popping the current security level indication from the stack circuitry into the current security level circuitry.

8. An interrupt security circuit as in claim 7, wherein the interrupt end detection circuitry detects the end to interrupt processing by detecting a non-sequential instruction fetch of the processor.

9. An interrupt security circuit for use with an interrupt-capable processor, wherein the processor, in an unsecure mode, responds to an interrupt by retrieving unprotected interrupt information from generally accessible interrupt information register circuitry and by executing an interrupt processing routine indicated by the unprotected interrupt information, the interrupt security unit comprising:

secure interrupt information register circuitry that holds a protected copy of the interrupt information;

interrupt detection circuitry that detects an interrupt and that causes the secure interrupt information register circuitry to provide the protected copy of the interrupt information to the processor in place of the unprotected interrupt information which would otherwise be provided to the processor from the generally accessible interrupt information register circuitry, such that the processor executes an interrupt routine indicated by the protected copy of the interrupt information;

programmable circuitry associated with each of a plurality of processor-addressable memory space blocks for holding a corresponding privilege indication associated with that memory space block; and access validation circuitry that determines which of said memory space segments is being addressed by the processor and that compares the current privilege level access indication with the privilege level access indication associated with the memory space segment being addressed.

10. The interrupt security circuit of claim 9, wherein said access validation circuitry includes violation indication means that indicates a result of the comparison.

* * * * *